Patented June 18, 1940

2,205,159

UNITED STATES PATENT OFFICE 2,205,159

POLYMERIZATION OF OLEFINS

Donald R. Stevens, Swissvale, and William A. Gruse, Wilkinsburg, Pa., assignors to Gulf Research & Development Company, Wilmington, Del., a corporation of Delaware No Drawing. Application October 22, 1936, Serial No. 107,102

13 Claims. (Cl. 260—683)

This invention relates to polymerization of olefins, and it comprises a method of treating olefinic gases for the production of low-boiling liquid polymers useful as a motor fuel, which comprises bringing the olefinic gases into contact with a strong acid such as strong sulfuric acid or benzene sulfonic acid, in the presence of boric acid, the boric acid acting as a modifying or mitigating agent to restrain undesirable non-polymerizing activities of the acid and to regulate and control the degree of polymerization of the olefins; all as more fully hereinafter set forth and as claimed.

Considerable attention has been paid in recent years to the polymerization of olefinic gases for the production of low-boiling liquid polymers useful as motor fuel. Various thermal and catalytic processes have been proposed and used. Of the catalytic processes, one which has attained some success relies upon the use of phosphoric acid as a polymerizing catalyst. Commercial sirupy phosphoric acid (orthophosphoric acid) can be used to give a fair yield of polymers from olefinic gases, when properly employed, and the products obtained are largely useful as motor fuel. However, the process is subject to some disadvantages; phosphoric acid is relatively expensive and at high temperatures the ortho acid tends to go over to dehydrated forms (pyro and meta acids) in an irregular way with irregular results. Sometimes volatile esters are produced.

Sulfuric acid is free from the disadvantages noted and is much cheaper than phosphoric acid, but it is a stronger acid and this fact imposes some restriction upon its use. If high-strength acid is used, it tends at elevated temperatures to react with the hydrocarbons undergoing treatment, forming sulfur dioxide and carbonization products. Strong sulfuric acid also tends to have too strong a polymerization effect, producing polymers which are too high boiling to be used for gasoline motor fuel. It cannot be re-used. On the other hand, dilute sulfuric acid is largely restricted in its polymerization effect to iso-butylene. Thus iso-butylene may be polymerized to the dimer (di-isobutylene) and the trimer (tri-iso-butylene) by absorption of iso-butylene in 60 to 65 per cent $H_2SO_4$, the acid subsequently adjusted in acidity and warmed to separate polymerized products, as disclosed in our copending application Serial No. 54,336, filed December 13, 1935, said method comprising a modification of the well known Butlerow method described in the literature as far back as 1877.

Our present invention comprises a process of polymerizing gaseous olefins in which the disadvantages of the strong-acid processes mentioned hereinabove are overcome. According to our invention, the polymerizing agent comprises a mixture of a strong acid, such as strong sulfuric acid, benzene sulfonic acid, toluene sulfonic acid, phenol sulfonic acid, naphthalene sulfonic acid or the like, with boric acid. The boric acid has a modifying or mitigating effect upon the activity of the strong acid, not only reducing or eliminating the tendency toward undesirable side reactions, but controlling the extent of polymerization, so that the resultant polymers are more volatile than would otherwise be the case, and are hence more suitable as motor fuel.

When a high yield of gasoline polymers is desired, the process is carried out by subjecting olefinic gases containing butylenes or propylene or both to contact with the mixture of strong acid and mitigating agent at a suitable elevated temperature preferably one sufficiently high to permit volatilization and removal of polymers as they are formed, the polymers being subsequently condensed. On the other hand, when a high yield of polymers heavier than gasoline is desired, as in the manufacture of a safety fuel of low volatility, lower temperatures are employed; in this case the liquid polymers may not entirely volatilize and may be separated from the catalyst in liquid form.

It is advantageous to distribute the mixture of strong acid and mitigating agent upon a suitable inert carrier such as pumice, fuller's earth or the like, for contact purposes.

The strength of the acid employed may vary considerably in accordance with the temperature employed and the results desired. Ordinarily we prefer to use 80 to 90 per cent sulfuric acid. However, somewhat more dilute acid, for example down to 65 per cent sulfuric acid, may be employed at high temperatures if desired, although a diminution in the extent of polymerization results, especially with regard to relatively dilute olefinic gases. On the other hand, 90 to 100 per cent acid may be employed, especially with relatively dilute olefinic gases, but the polymers formed tend to be somewhat less volatile; the use of 90 to 100 per cent sulfuric acid is however useful for the manufacture of safety fuel and similar products of relatively low volatility.

The temperatures employed will depend largely upon the concentration of the acid and the olefinic starting material, but in general should be sufficient to permit vaporization and removal of the polymers or a desired fraction thereof. With the preferred 80 to 90 per cent sulfuric acid, the temperatures may run as high as 200° C., while with the sulfonic acids temperatures not exceeding 150° C. are desirable in order to reduce decomposition tendencies. High operating temperatures are advisable when it is desired to obtain a relatively volatile product; i. e., one containing a high ratio of polymers boiling below 140° C. Contact times of from one to five minutes are preferred.

The pressures employed in the operation may run as high as 500 pounds per square inch, the higher pressures being especially useful when relatively dilute olefinic gases are employed as starting material, but ordinarily the preferred pressure range is from 100 to 300 pounds per square inch.

The amount of boric acid used will in general run from 10 per cent to 25 per cent by weight of the strong acid, but high proportions of boric acid may require the use of relatively high temperatures of operation. We have obtained the most advantageous results by using boric acid in an amount equal to from 15 to 20 per cent by weight of the strong acid, this range of proportions being sufficient to give the desired mitigating action without any undesirable effect.

In a practical embodiment of the invention directed toward the production of polymers boiling within the range of ordinary gasoline, 1000 parts by weight of a refinery butane cut were contacted for five minutes with 1270 parts by weight of 90 per cent sulfuric acid, admixed with 20 per cent by weight of boric acid. The hydrocarbon phase which separated off above the acid layer was freed of butane by releasing pressure and weathering, and was subsequently alkali washed and fractionally distilled. The product, amounting to 50 per cent by weight of the unsaturated content of the original gases, had the following distillation characteristics:

|  | Per cent |
|---|---|
| Below 140° C | 27 |
| 140° to 190° C | 52 |
| Above 190° C | 21 |

Only a slight tendency towards side reactions was observed in the above example, as indicated by the absence of the odor of $SO_2$ and the light color of the acid after use.

By way of comparison with the above results, the use of 90 per cent sulfuric acid, without boric acid, gave a polymer having the following distillation characteristics:

|  | Per cent |
|---|---|
| Below 140° C | 9.5 |
| 140° to 190° C | 28.5 |
| Above 190° C | 62 |

In this experiment a strong tendency toward side reactions was observed, $SO_2$ being evolved and the acid being darkened considerably and rendered unfit for further use; it contained considerable tarry matter.

We may mention at this point that one of the advantages of our present invention is that the mixture of acid and mitigating agent may be repeatedly employed in batch operation and is capable of being employed over long periods in continuous operation.

Both of the runs above noted above were carried out at a temperature of 70° F. and under only such pressure as developed in a closed system. Naturally, as would be expected, the total yield of liquid polymer per pass is somewhat lower when boric acid is employed as a mitigating agent than when sulfuric acid of the same strength is employed alone, but this is due primarily to the formation in the latter instance of polymers which are too high boiling to be desirable for use as gasoline motor fuel; the total yield of gasoline-like polymers is higher in the case of the mitigated acid than in the case of the strong acid alone.

In the above runs, the refinery gas employed was a so-called "butane cut" containing 32 per cent iso-butylene, 32 per cent 1-butene and 2-butene, 5.7 per cent of $C_3$ hydrocarbons, and the balance consisting of normal and iso-butane. Our experiments have shown that our process polymerizes not only iso-butylene but also 1-butene and 2-butene, as well as propylene. Ethylene is less readily polymerized.

In another embodiment of our invention, isobutylene was contacted in one run with benzene sulfonic acid and in a second run with a mixture of 100 parts by weight of benzene sulfonic acid and 15 parts by weight of boric acid, the temperature in each case being 180° F. In the case of benzene sulfonic acid alone, there was considerable evolution of $SO_2$, evidence of side reactions and decomposition; this effect was hardly noticeable in the case of the mitigated acid. The polymers recovered in the second run were largely within the gasoline boiling-point range, while those resulting from the use of the unmitigated acid contained a much larger proportion of material heavier than gasoline. The total yield in the second run was lower, but by repeating the contact in a series of operations, it is possible to obtain a higher yield of low-boiling gasoline-like polymers than can be obtained by the use of unmitigated strong acid.

Where the refinery gases employed have contained small amounts of sulfur, the polymers obtained have manifested a tendency toward a relatively high sulfur content, but we have experienced no difficulty in treating the latter by simply washing the polymer with dilute alkali solution. Wherever sulfur is present in the original gas in such form that the polymers would contain sulfur in a form difficult to remove by ordinary methods, the gases may be subjected to a simple desulfurization treatment in any well known manner before being brought into contact with the polymerizing catalyst.

In order to increase the yield of polymers, the gases are passed through a series of reactors containing the mitigated acid, preferably supported upon an inert carrier as described. Recycling is not ordinarily desirable unless the original gases consist predominantly of polymerizable olefins.

It may be observed that at the higher temperatures, and when the gases are dry, the acid mixture may tend to lose moisture and become more concentrated. In continuous operation, this effect is readily overcome by adding sufficient moisture, either to the acid or to the gases, to balance the dehydrating effect and maintain the acid at the desired concentration.

While our invention has been described hereinabove with reference to the polymerization of a particular butane cut, it will be obvious that other refinery gases and other olefinic gases in general may be employed as starting materials, in so far as they contain substantial quantities of polymerizable olefin constituents. Moreover, while our invention has been described in connection with its preferred embodiment, that is the straight polymerization of gaseous olefins to liquid polymers useful as motor fuels, the mixture of strong acid and mitigating agent may be employed in other reactions, for example certain condensation reactions, in which sulfuric acid is contacted with olefins for the purpose of producing products of higher complexity by polymerization or condensation and where it is desired to eliminate or reduce the undesirable decomposition reactions which would otherwise result from the use of strong unmitigated acid.

In the polymerization process described, the resultant polymers are of especial value as motor fuel, both by reason of their volatility and by reason of their high anti-knock value, which applies not only to those constituents boiling within the ordinary gasoline boiling point range, but also to somewhat higher boiling polymers, which may be used as safety fuel, for example, in internal combustion engines of the so-called "direct injection" type other than Diesel-type engines. Variation in the temperature of operation, as aforesaid, will affect the proportions of high- and low-boiling polymers formed.

For example, we have found that in polymerizing iso-butylene with benzene sulfonic acid containing 15 per cent by weight of boric acid, an increase in the temperature of operation results in a much higher yield of low-boiling polymers and vice versa, as indicated by the following comparative results:

| Temperature °C | 82 | 121 |
|---|---|---|
| Pressure | Atmospheric | Atmospheric |
| Distillation characteristics of polymers: | | |
| Up to 140° C percent | 19.2 | 50.0 |
| 140° C. to 200° C do | 69.1 | 34.0 |
| Above 200° C do | 12.7 | 16.0 |

Consequently, when it is desired to manufacture relatively high-boiling polymers, a relatively low temperature not exceeding, say, 100° C. should be employed.

It will be apparent to those skilled in the art that, whereas our invention has been described hereinabove in connection with various specific operating details by way of example, our invention is not in its broadest aspects limited to such operating details, but may be variously practiced within the scope of the claims hereinafter made.

What we claim is:

1. In a process of forming valuable compounds of higher molecular weight from normally gaseous olefins under the influence of a strong acid catalyst of the class consisting of sulphuric and sulphonic acids, the improvement which comprises effecting contact between the olefinic starting material and the strong acid catalyst in the presence of boric acid, the boric acid being present in such amount as to restrain non-polymerizing action of the strong acid upon the hydrocarbon.

2. The process of making liquid polymers from olefins of the class comprising propylene and butylenes, which comprises subjecting such olefinic material to contact with a mixture of a strong acid of the class consisting of sulphuric and sulphonic acids and boric acid, the boric acid being present in an amount sufficient to inhibit non-polymerizing action of the strong acid upon the hydrocarbon.

3. The process of making liquid polymers from olefins of the class comprising propylene and butylenes, which comprises subjecting such olefinic material to contact with a mixture of a strong acid of the class consisting of sulphuric and sulphonic acids and boric acid, the boric acid being present in an amount sufficient to inhibit non-polymerizing action of the strong acid upon the hydrocarbon, at a temperature sufficiently high to cause the resultant polymers to vaporize, and condensing said polymers.

4. A process as set forth in claim 2 wherein the strong acid is 80 to 90 per cent sulfuric acid.

5. A process as set forth in claim 3 wherein the boric acid is present in an amount equal to from 10 to 25 per cent by weight of the strong acid.

6. A process as set forth in claim 2 wherein the strong acid is benzene sulfonic acid.

7. The process of making liquid polymers from olefins of the class comprising propylene and butylenes, which comprises passing a stream of olefinic gas over an inert carrier impregnated with a mixture of 80 to 90 per cent sulfuric acid and boric acid, the boric acid being present in an amount sufficient to inhibit non-polymerizing action of the strong acid upon the hydrocarbon, at a temperature not exceeding 200° C., and condensing the stream of gas leaving the catalyst to remove resultant gasoline-like polymers therefrom.

8. The process of making liquid polymers useful as a safety fuel and containing a relatively high proportion of constituents boiling from 140° C. to 200° C. from olefins of the class comprising propylene and butylenes, which comprises passing a stream of olefinic gas into contact with a mixture of a strong acid of the class consisting of sulphuric and sulphonic acids and boric acid at a temperature not exceeding 100° C. and removing the normally liquid polymers thereby obtained 9. As a catalyst for the polymerization of olefins, a mixture of strong acid of the class consisting of sulphuric and sulphonic acids and an amount of boric acid sufficient to inhibit non-polymerizing action of the strong acid on the olefins.

10. As a catalyst for the polymerization of olefins, a mixture of 100 parts by weight of 80 to 90 per cent sulfuric acid and from 10 to 25 parts by weight of boric acid.

11. As a catalyst for the polymerization of olefins, a mixture of benzene sulfonic acid and an amount of boric acid sufficient to inhibit the non-polymerizing action of the benzene sulfonic acid on the olefins.

12. A process as set forth in claim 2 wherein the strong acid is a phenol sulfonic acid.

13. A process of producing a hydrocarbon product boiling within the gasoline range comprising contacting a mixture consisting predominantly of $C_4$ olefins and paraffins with a mixture of a strong acid selected from the group consisting of sulfuric and sulfonic acids, with 10 to 25 per cent by weight of boric acid.

DONALD R. STEVENS.
WILLIAM A. GRUSE.